United States Patent
Hua

(10) Patent No.: US 11,327,666 B2
(45) Date of Patent: May 10, 2022

(54) RAID MEMBER DISTRIBUTION FOR GRANULAR DISK ARRAY GROWTH

(71) Applicant: EMC IP HOLDING COMPANY LLC, Hopkinton, MA (US)

(72) Inventor: Kuolin Hua, Natick, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/009,812

(22) Filed: Sep. 2, 2020

(65) Prior Publication Data

US 2022/0066658 A1 Mar. 3, 2022

(51) Int. Cl.
*G06F 3/06* (2006.01)

(52) U.S. Cl.
CPC .......... *G06F 3/0623* (2013.01); *G06F 3/0644* (2013.01); *G06F 3/0689* (2013.01)

(58) Field of Classification Search
CPC .... G06F 3/0607; G06F 3/0623; G06F 3/0631; G06F 3/0644; G06F 3/0647; G06F 3/0688; G06F 3/0689
USPC ................................. 711/114, 171, 172, 173
See application file for complete search history.

(56) References Cited

U.S. PATENT DOCUMENTS

| 7,447,837 | B2 * | 11/2008 | Watanabe | G06F 3/0607 707/999.202 |
| 7,721,044 | B1 * | 5/2010 | Chatterjee | G06F 3/067 711/114 |
| 8,656,131 | B2 * | 2/2014 | Wicklund | G06F 3/0632 711/170 |
| 8,725,986 | B1 * | 5/2014 | Goel | G06F 3/0614 711/209 |
| 2014/0351512 | A1 * | 11/2014 | Xu | G06F 3/0631 711/114 |

* cited by examiner

*Primary Examiner* — Gary J Portka
(74) *Attorney, Agent, or Firm* — Anderson Gorecki LLP

(57) ABSTRACT

A subset of drives with protection groups that have D data members and P parity members is scaled in single drive increments. A plurality of indexed partitions equal in size and number are created on (D+P) indexed drives. Protection groups that have D data members and P parity members are created on individual partition indexes of the (D+P) drives. When a new drive is added some of the protection group members located on the (D+P) drives are selected using modulo arithmetic. The selected protection group members are relocated to the new drive and new protection groups are created using the partitions made available due to the relocations. When (D+P) new drives have been added the drive subset may be split into two drive subsets. The modulo arithmetic may include selecting the members of protection group X that are on partition X of drive Y that satisfy the condition (X−Y+N−1) modulo W=0, where N is a count of new drives added to the (D+P) drives and W=(D+P). Alternatively, the modulo arithmetic may include selecting the members of protection group X on partition X of drive Y that satisfy the condition (X+Y−N−1) modulo W=0.

22 Claims, 11 Drawing Sheets

| drive\part | 1 | 2 | 3 | 4 | 5 | 6 | 7 | 8 |
|---|---|---|---|---|---|---|---|---|
| 1 |   | 2 | 3 | 4 |   | 6 | 7 | 8 |
| 2 | 1 |   | 3 | 4 | 5 |   | 7 | 8 |
| 3 | 1 | 2 |   | 4 | 5 | 6 |   | 8 |
| 4 | 1 | 2 | 3 |   | 5 | 6 | 7 |   |

| drive\part | 1 | 2 | 3 | 4 | 5 | 6 | 7 | 8 |
|---|---|---|---|---|---|---|---|---|
| 5 | 1 | 2 | 3 | 4 | 5 | 6 | 7 | 8 |

Figure 5A

| drive\part | 1 | 2 | 3 | 4 | 5 | 6 | 7 | 8 |
|---|---|---|---|---|---|---|---|---|
| 1 | A | 2 | 3 | 4 | B | 6 | 7 | 8 |
| 2 | 1 | A | 3 | 4 | 5 | B | 7 | 8 |
| 3 | 1 | 2 | A | 4 | 5 | 6 | B | 8 |
| 4 | 1 | 2 | 3 | A | 5 | 6 | 7 | B |

| drive\part | 1 | 2 | 3 | 4 | 5 | 6 | 7 | 8 |
|---|---|---|---|---|---|---|---|---|
| 5 | 1 | 2 | 3 | 4 | 5 | 6 | 7 | 8 |

Figure 5B

| drive\part | 1 | 2 | 3 | 4 | 5 | 6 | 7 | 8 |
|---|---|---|---|---|---|---|---|---|
| 1 | A | 2 | 3 | 4 | B | 6 | 7 | 8 |
| 2 | 1 | A | 3 | 4 | 5 | B | 7 | 8 |
| 3 | 1 | 2 | A | 4 | 5 | 6 | B | 8 |
| 4 | 1 | 2 | 3 | A | 5 | 6 | 7 | B |
| 5 | 1 | 2 | 3 | 4 | 5 | 6 | 7 | 8 |
| 6 | | | | | | | | |

Figure 6A

| drive\part | 1 | 2 | 3 | 4 | 5 | 6 | 7 | 8 |
|---|---|---|---|---|---|---|---|---|
| 1 | A | 2 | 3 | | B | 6 | 7 | |
| 2 | | A | 3 | 4 | | B | 7 | 8 |
| 3 | 1 | | A | 4 | 5 | | B | 8 |
| 4 | 1 | 2 | | A | 5 | 6 | | B |
| 5 | 1 | 2 | 3 | 4 | 5 | 6 | 7 | 8 |
| 6 | 1 | 2 | 3 | 4 | 5 | 6 | 7 | 8 |

Figure 6B

| drive\part | 1 | 2 | 3 | 4 | 5 | 6 | 7 | 8 |
|---|---|---|---|---|---|---|---|---|
| 1 | A | 2 | 3 | C | B | 6 | 7 | D |
| 2 | C | A | 3 | 4 | D | B | 7 | 8 |
| 3 | 1 | C | A | 4 | 5 | D | B | 8 |
| 4 | 1 | 2 | C | A | 5 | 6 | D | B |

| drive\part | 1 | 2 | 3 | 4 | 5 | 6 | 7 | 8 |
|---|---|---|---|---|---|---|---|---|
| 5 | 1 | 2 | 3 | 4 | 5 | 6 | 7 | 8 |
| 6 | 1 | 2 | 3 | 4 | 5 | 6 | 7 | 8 |

Figure 7A

| drive\part | 1 | 2 | 3 | 4 | 5 | 6 | 7 | 8 |
|---|---|---|---|---|---|---|---|---|
| 1 | A | 2 | 3 | C | B | 6 | 7 | D |
| 2 | C | A | 3 | 4 | D | B | 7 | 8 |
| 3 | 1 | C | A | 4 | 5 | D | B | 8 |
| 4 | 1 | 2 | C | A | 5 | 6 | D | B |
| 5 | 1 | 2 | 3 | 4 | 5 | 6 | 7 | 8 |
| 6 | 1 | 2 | 3 | 4 | 5 | 6 | 7 | 8 |
| 7 |   |   |   |   |   |   |   |   |

Figure 7B

| drive\part | 1 | 2 | 3 | 4 | 5 | 6 | 7 | 8 |
|---|---|---|---|---|---|---|---|---|
| 1 | A | 2 |   | C | B | 6 |   | D |
| 2 | C | A | 3 |   | D | B | 7 |   |
| 3 |   | C | A | 4 |   | D | B | 8 |
| 4 | 1 |   | C | A | 5 |   | D | B |
| 5 | 1 | 2 | 3 | 4 | 5 | 6 | 7 | 8 |
| 6 | 1 | 2 | 3 | 4 | 5 | 6 | 7 | 8 |
| 7 | 1 | 2 | 3 | 4 | 5 | 6 | 7 | 8 |

Figure 8A

| drive\part | 1 | 2 | 3 | 4 | 5 | 6 | 7 | 8 |
|---|---|---|---|---|---|---|---|---|
| 1 | A | 2 | E | C | B | 6 | F | D |
| 2 | C | A | 3 | E | D | B | 7 | F |
| 3 | E | C | A | 4 | F | D | B | 8 |
| 4 | 1 | E | C | A | 5 | F | D | B |
| 5 | 1 | 2 | 3 | 4 | 5 | 6 | 7 | 8 |
| 6 | 1 | 2 | 3 | 4 | 5 | 6 | 7 | 8 |
| 7 | 1 | 2 | 3 | 4 | 5 | 6 | 7 | 8 |

Figure 8B

| drive\part | 1 | 2 | 3 | 4 | 5 | 6 | 7 | 8 |
|---|---|---|---|---|---|---|---|---|
| 1 | A | 2 | E | C | B | 6 | F | D |
| 2 | C | A | 3 | E | D | B | 7 | F |
| 3 | E | C | A | 4 | F | D | B | 8 |
| 4 | 1 | E | C | A | 5 | F | D | B |
| 5 | 1 | 2 | 3 | 4 | 5 | 6 | 7 | 8 |
| 6 | 1 | 2 | 3 | 4 | 5 | 6 | 7 | 8 |
| 7 | 1 | 2 | 3 | 4 | 5 | 6 | 7 | 8 |
| 8 | | | | | | | | |

Figure 9A

| drive\part | 1 | 2 | 3 | 4 | 5 | 6 | 7 | 8 |
|---|---|---|---|---|---|---|---|---|
| 1 | A | | E | C | B | | F | D |
| 2 | C | A | | E | D | B | | F |
| 3 | E | C | A | | F | D | B | |
| 4 | | E | C | A | | F | D | B |

| drive\part | 1 | 2 | 3 | 4 | 5 | 6 | 7 | 8 |
|---|---|---|---|---|---|---|---|---|
| 5 | 1 | 2 | 3 | 4 | 5 | 6 | 7 | 8 |
| 6 | 1 | 2 | 3 | 4 | 5 | 6 | 7 | 8 |
| 7 | 1 | 2 | 3 | 4 | 5 | 6 | 7 | 8 |
| 8 | 1 | 2 | 3 | 4 | 5 | 6 | 7 | 8 |

Figure 9B

RAID MEMBER DISTRIBUTION FOR GRANULAR DISK ARRAY GROWTH

TECHNICAL FIELD

The subject matter of this disclosure is generally related to electronic data storage and more particularly to drive array protection group subsets that can be scaled and split.

BACKGROUND

Protection groups help to avoid data loss by enabling a failing or failed protection group member to be reconstructed. In a typical data storage system, the individual disk drives are protection group members, e.g. members of a redundant array of independent drives (RAID) protection group. A RAID (D+P) protection group has D data members and P parity members. The data members store data. The parity members store parity information such as XORs of data values. The parity information enables reconstruction of data in the event that a data member fails. Parity information can be reconstructed from the data on the data members in the event that a parity member fails. A failed protection group member is reconstructed on a spare drive.

It is sometimes necessary to increase the total storage capacity of a data storage system. For example, storage capacity may have to be increased when existing storage capacity becomes fully utilized. The storage capacity of a data storage system that uses individual drives as protection group members is increased by adding a new protection group, i.e. (D+P) drives for a RAID (D+P) protection group. A storage system that implements RAID-5 (4+1), for example, may be scaled-up in increments of five new drives. Similarly, a RAID-5 (3+1) may be scaled-up in increments of four new drives. One drawback of scaling storage capacity in increments of (D+P) new drives is that it may introduce excess storage capacity that will not be utilized within a reasonable timeframe. This drawback is becoming more troublesome as the storage capacity of individual drives increases due to technological advancements. More specifically, as the storage capacity and cost of drives increases, the amount of excess storage capacity and cost associated with adding D+P drives to a storage system also increases, particularly for larger values of (D+P).

SUMMARY

All examples, aspects and features mentioned in this document can be combined in any technically possible way.

In accordance with some implementations a method comprises: creating a plurality of indexed partitions equal in size and number on (D+P) indexed drives; creating protection groups that have D data members and P parity members on individual partition indexes of the (D+P) drives; adding a new drive with indexed partitions equal in size and number to the indexed partitions of the (D+P) drives; selecting protection group members located on the (D+P) drives using modulo arithmetic; and relocating the selected protection group members to the new drive.

In accordance with some implementations an apparatus comprises: a plurality of non-volatile drives; a plurality of interconnected compute nodes that manage access to the drives; and a drive manager configured to create a drive subset of (D+P) drives for implementation of protection groups that have D data members and P parity members, each of the selected drives having M*(D+P) sequentially indexed partitions; and a drive manager responsive to addition of a new drive with indexed partitions equal in size and number to the indexed partitions of the (D+P) drives to select protection group members located on the (D+P) drives using modulo arithmetic and relocate the selected protection group members to the new drive.

A computer-readable storage medium in accordance with some implementations stores instructions that when executed by a computer cause the computer to perform a method for using a computer system to scale a subset of drives, the method comprising: creating a plurality of indexed partitions equal in size and number on (D+P) indexed drives; creating protection groups that have D data members and P parity members on individual partition indexes of the (D+P) drives; adding a new drive with indexed partitions equal in size and number to the indexed partitions of the (D+P) drives; selecting protection group members located on the (D+P) drives using modulo arithmetic; and relocating the selected protection group members to the new drive.

Other aspects, features, and implementations may become apparent in view of the detailed description and figures.

BRIEF DESCRIPTION OF THE FIGURES

FIGS. 5A and 5B illustrate creation of new protection groups using the partitions freed by movement of existing protection group members to the first new drive.

FIG. 6A illustrates selection and movement of protection group members to a second new drive.

FIGS. 6B and 7A illustrate creation of new protection groups using the partitions freed by movement of existing protection group members to the second new drive.

FIG. 7B illustrates selection and movement of protection group members to a third new drive.

FIGS. 8A and 8B illustrate creation of new protection groups using the partitions freed by movement of existing protection group members to the third new drive.

FIG. 9A illustrates selection and movement of protection group members to a fourth new drive.

FIGS. 9B and 10 illustrate creation of new protection groups using the partitions freed by movement of existing protection group members to the fourth new drive and splitting of the subset of drives into two subsets of drives.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile storage media. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer. The term "logic," if used herein, refers to special purpose physical circuit elements, firmware, software, computer instructions that are stored on a non-transitory computer-readable medium and implemented by multi-purpose tangible processors, alone or in any combination. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
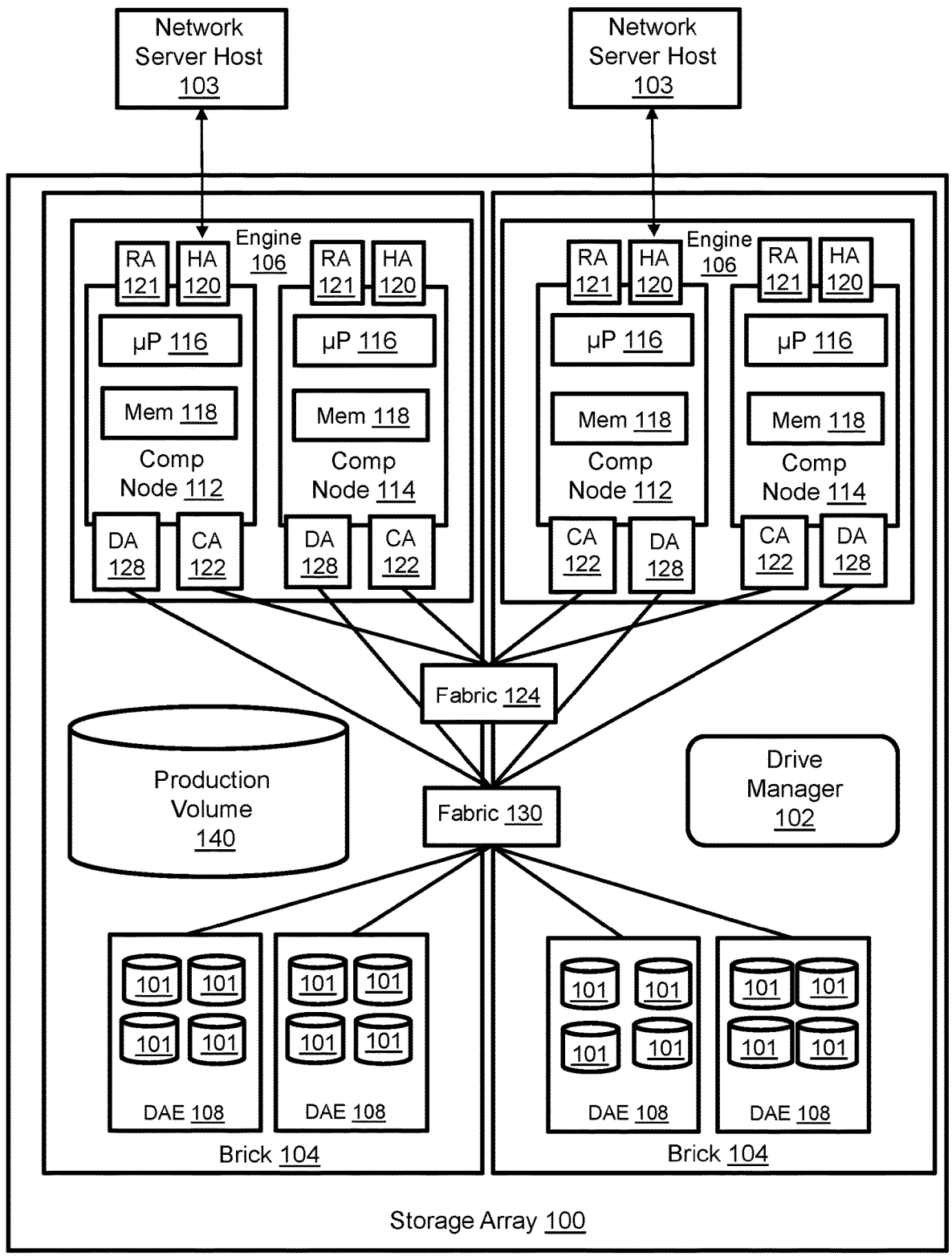
FIG. 1 illustrates a storage array with a drive manager that implements RAID member distribution for granular drive array growth.

FIG. 1 illustrates a storage array 100 with a drive manager 102 that implements RAID member distribution for granular drive array growth. Each drive subset with protection groups managed by the drive manager is scalable in single drive increments and is split into multiple drive subsets when enough drives have been added. The storage array is one example of a storage area network (SAN), which is one example of a data storage system in which the drive manager could be implemented. The storage array 100 is depicted in a simplified data center environment supporting two network server hosts 103 that run host applications. The hosts 103 include volatile memory, non-volatile storage, and one or more tangible processors. The storage array 100 includes one or more bricks 104. Each brick includes an engine 106 and one or more drive array enclosures (DAEs) 108. Each engine 106 includes a pair of interconnected compute nodes 112, 114 that are arranged in a failover relationship and may be referred to as "storage directors." Although it is known in the art to refer to the compute nodes of a SAN as "hosts," that naming convention is avoided in this disclosure to help distinguish the network server hosts 103 from the compute nodes 112, 114. Nevertheless, the host applications could run on the compute nodes, e.g. on virtual machines or in containers. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the hosts 103. Each host adapter has resources for servicing input-output commands (IOs) from the hosts. The host adapter resources may include processors, volatile memory, and ports via which the hosts may access the storage array. Each compute node also includes a remote adapter (RA) 121 for communicating with other storage systems. Each compute node also includes one or more drive adapters (DAs) 128 for communicating with managed drives 101 in the DAEs 108. Each drive adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media such as, without limitation, solid-state drives (SSDs) based on electrically erasable programmable read-only memory (EEPROM) technology such as NAND and NOR flash memory and hard disk drives (HDDs) with spinning disk magnetic storage media. Drive controllers may be associated with the managed drives as is known in the art. An interconnecting fabric 130 enables implementation of an N-way active-active backend. A backend connection group includes all drive adapters that can access the same drive or drives. In some implementations every drive adapter 128 in the storage array can reach every DAE via the fabric 130. Further, in some implementations every drive adapter in the storage array can access every managed drive 101.

Data associated with the hosted application instances running on the hosts 103 is maintained on the managed drives 101. The managed drives 101 are not discoverable by the hosts but the storage array creates a logical storage device referred to herein as a production volume 140 that can be discovered and accessed by the hosts. Without limitation, the production volume may also be referred to as a storage object, source device, production device, or production LUN, where the logical unit number (LUN) is a number used to identify logical storage volumes in accordance with the small computer system interface (SCSI) protocol. From the perspective of the hosts 103, the production volume 140 is a single drive having a set of contiguous fixed-size logical block addresses (LBAs) on which data used by the instances of the host application resides. However, the host application data is stored at non-contiguous addresses on various managed drives 101. The compute nodes maintain metadata that maps between the production volume 140 and the managed drives 101 in order to process IOs from the hosts.

Figure 2:
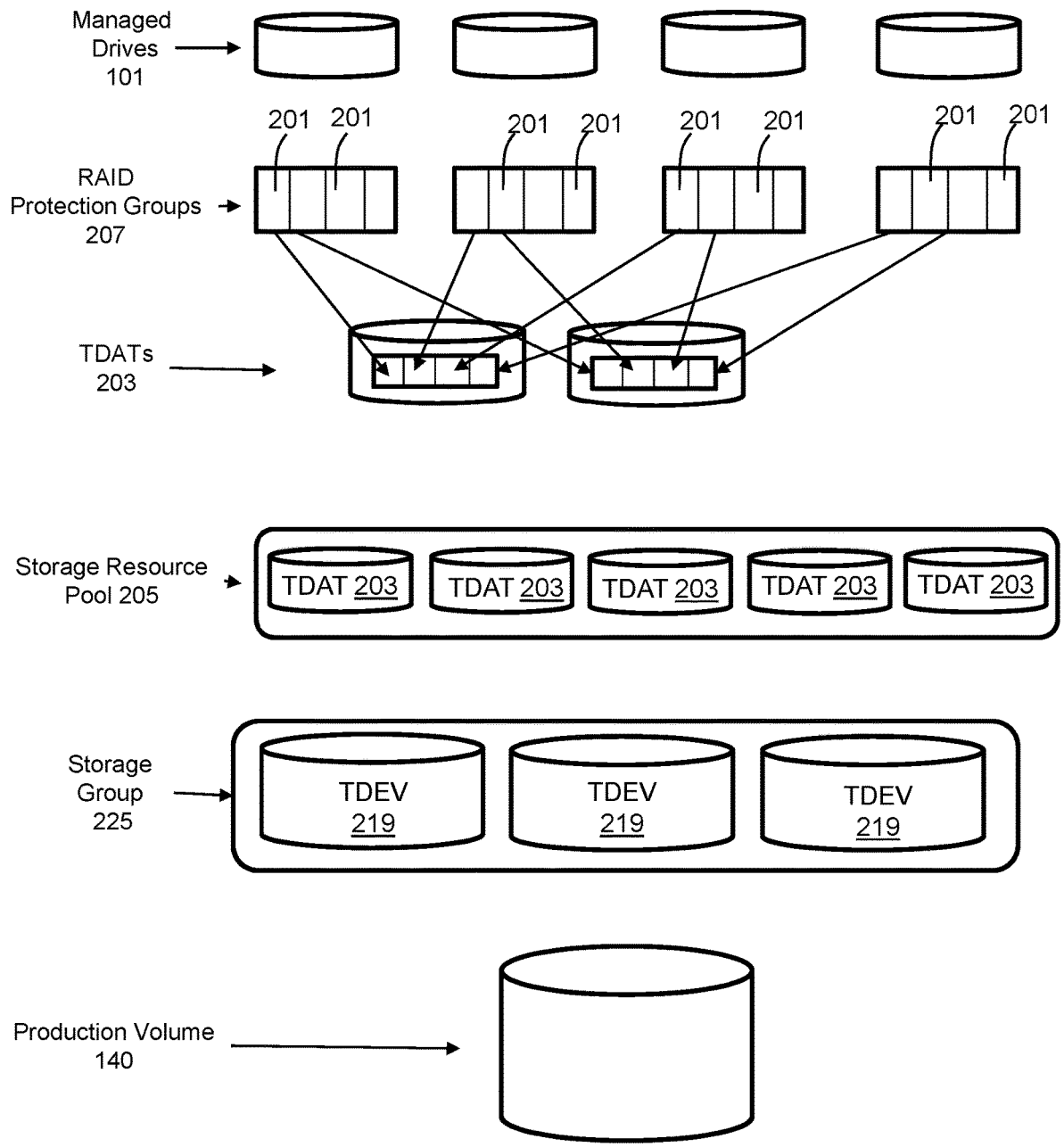
FIG. 2 illustrates layers of abstraction between the managed drives and the production volume of the storage array of FIG. 1.

FIG. 2 illustrates layers of abstraction between the managed drives 101 and the production volume 140. The smallest unit of storage capacity that can be processed by a managed drive 101 is a sector. Different types of managed drives may be characterized by different sector sizes but for context and without limitation the sector size of all managed drives may be 2 KB. IOs between the compute nodes and the managed drives may be in larger allocation units such as 128 KB tracks that are a fixed size that may be an integer multiple of the sector size. For example, an IO may read or write the sectors of a track. The managed drives 101 are each organized into partitions 201 of equal storage capacity, i.e. every partition has the same fixed size. Selection of partition storage capacity is a design implementation and, for context and without limitation, may be some fraction or percentage of the capacity of a managed drive equal to an integer multiple of sectors greater than 1. Each partition may include a contiguous range of logical addresses. Groups of partitions that include partitions from different managed drives are used to create RAID protection groups 207. The RAID protection groups are distributed on data devices (TDATs) 203. A storage resource pool 205, also known as a "data pool" or "thin pool," is a collection of TDATs 203 of the same emulation and RAID protection group type, e.g. RAID-5. In some implementations all TDATs in a drive group are of a single RAID protection group type and all have the same size (storage capacity). Logical thin devices (TDEVs) 219 are created using TDATs. The TDATs and TDEVs are accessed using tracks as the allocation unit. Multiple TDEVs 219 are organized into a storage group 225. The production volume 140 is created from a single storage group 225. Host application data, which is stored in blocks on the production volume 140, is mapped to tracks of the TDEVs, which map to sectors of the managed drives. Regardless of the specific allocation unit capacities selected, a track is larger than both the sectors and the fixed size blocks used in communications between the storage array and the hosts to access the production volume.

Figure 3:
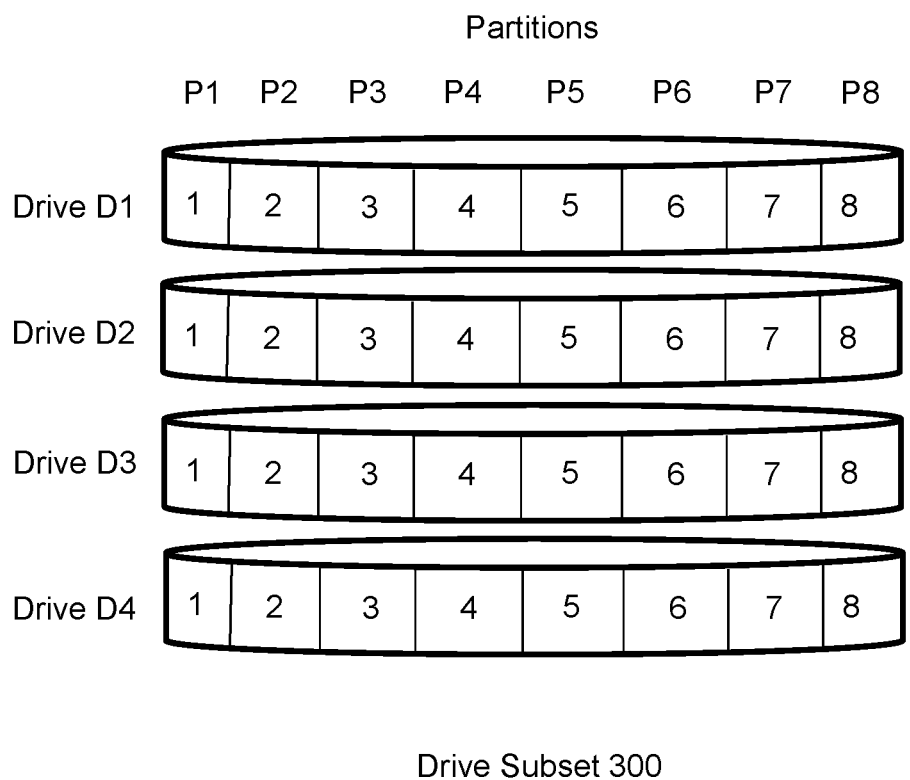
FIG. 3 illustrates an implementation of multiple RAID (D+P) protections groups on partitions of a subset of the managed drives.

FIG. 3 illustrates an implementation of multiple RAID (D+P) protections groups on partitions of a new drive subset 300 of the managed drives 101 (FIG. 1). The storage array includes multiple drive subsets, each of which is created with (D+P) drives but can be scaled and split as described below. Each drive in the new drive subset 300 has M*(D+P) partitions where M is an integer value selected as a design choice. A RAID-5 (3+1) implementation is shown so there are W=(D+P)=(3+1)=4 drives D1 through D4 in the drive subset. M=2 in the illustrated example so there are M*(D+P)=2*(3+1)=8 partitions P1 through P8. No more than one member of a protection group may be located on the same drive and a different protection group is initially created in each partition, resulting in eight protections groups numbered 1 through 8 in partitions P1-P8. More specifically, the members of protection group 1 are each in the P1 partition of drives D1-D4, the members of protection group 2 are each in the P2 partition of drives D1-D4, the members of protection group 3 are each in the P3 partition of drives D1-D4, the members of protection group 4 are each in the P4 partition of drives D1-D4, the members of protection group 5 are each in the P5 partition of drives D1-D4, the members of protection group 6 are each in the P6 partition of drives D1-D4, the members of protection group 7 are each in the P7 partition of drives D1-D4, and the members of protection group 8 are each in the P8 partition of drives D1-D4. As will be described below, the initial configuration shown in FIG. 3 facilitates scaling and splitting using modulo arithmetic.

Figures 4A, 4B:
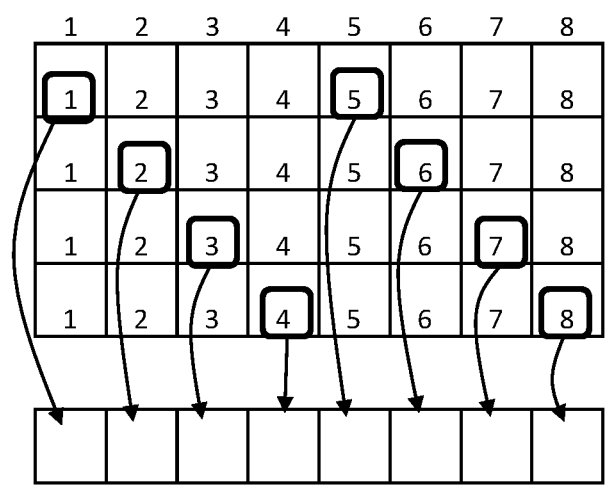
FIG. 4A is a matrix representation of the drive subset of FIG. 3.
FIG. 4B illustrates selection and movement of protection group members to a first new drive.

FIG. 4A is a matrix representation of the drive subset of FIG. 3. The matrix has W=D+P=4 rows that represent drives D1-D4 and M*W=8 columns that represent partitions P1-P8. The values in the matrix represent the protection group members. For example, the value 2 represents members of protection group 2, the value 4 represents members of protection group 4, and so forth. The matrix representation will be used below to describe scaling and splitting of the drive subset.

FIG. 4B illustrates selection and movement of protection group members to a first new drive that is added to the drive subset. A single new drive D5 represented by row 5 in the matrix is added to the drive subset. The new drive is formatted with the same number of partitions as the existing drives of the drive subset and all partitions have the same size as the partitions of the existing drives. In order to utilize the additional storage capacity of the new drive D5 the drive manager selects and relocates certain protection group members in a manner that enables creation of one or more additional protection groups without locating more than one member of a protection group on the same drive. Selection is determined by modulo arithmetic. Specifically, for the Nth new drive added to the drive subset, the members of protection group X at partition X of drive Y where (X−Y+N−1) modulo W=0 are selected and relocated to the new drive. Alternatively, the modulo arithmetic may include selecting the members of protection group X on partition X of drive Y that satisfy the condition (X+Y−N−1) modulo W=0. New drive D5 is the 1$^{st}$ new drive added to the drive subset so N=1. In the illustrated example the member of protection group 1 at partition P1 of drive D1 is selected because (1−1+1−1) modulo 4=0, the member of protection group 2 at partition P2 of drive D2 is selected because (2−2+1−1) modulo 4=0, the member of protection group 3 at partition P3 of drive D3 is selected because (3−3+1−1) modulo 4=0, the member of protection group 4 at partition P4 of drive 4 is selected because (4−4+1−1) modulo 4=0, and so forth. The member of protection group 4 at partition P4 of drive 2, for example, is not selected because (4−2+1−1) modulo 4≠0. The modulo arithmetic algorithm results in selection of M*(D+P) protection group members starting in the upper left corner of the matrix and located in diagonally adjacent matrix locations characterized by incremented row and column numbers and wrapping back to the first row and continuing.

The selected protection group members are relocated within their columns. Consequently, selected protection group members are relocated from partition X of an existing drive to partition X of the new drive. In the illustrated example the selected protection group member at partition P1 of drive D1 is moved to partition P1 of drive D5, the selected protection group member at partition P2 of drive D2 is moved to partition P2 of drive D5, the selected protection group member at partition P3 of drive D3 is moved to partition P3 of drive D5, and so forth. The result of selection and relocation is a fully populated new row 5, and thus new drive D5, that does not contain more than one member of any protection group.

FIGS. 5A and 5B illustrate creation of new protection groups using the partitions freed by relocation of selected protection group members from existing drives to the first new drive. FIG. 5A illustrates the M*(D+P) free partitions created by selection and relocation of protection group members in accordance with the selection algorithm. As shown in FIG. 5B, M new protection groups are created in sets of (D+P) available partitions selected in order from P1 to Pmax. A first set of (D+P) available partitions consists of partition P1 of drive D1, partition P2 of drive D2, partition P3 of drive D3, and partition P4 of drive D4. A new protection group "A" is created in the first set of (D+P) available partitions. A second set of (D+P) available partitions consists of partition P1 of drive D5, partition P2 of drive D6, partition P3 of drive D7, and partition P4 of drive D8. A new protection group "B" is created in the second set of (D+P) available partitions.

FIG. 6A illustrates selection and movement of protection group members to a second new drive D6 represented by new column 6. The new drive is formatted with the same number of partitions as the existing drives of the drive subset and all partitions have the same size as the partitions of the existing drives. In order to utilize the additional storage capacity of the new drive D6 the drive manager selects and relocates certain protection group members in a manner that enables creation of one or more additional protection groups without locating more than one member of a protection group on the same drive. Selection is again determined by the modulo arithmetic where now N=2 because new drive D6 is the second drive added to the drive subset. In the illustrated example the member of protection group 1 at partition P1 of drive D2 is selected because (X−Y+N−1) modulo W=(1−2+2−1) modulo 4=0, the member of protection group 2 at partition P2 of drive D3 is selected because (X−Y+N−1) modulo W=(2−3+2−1) modulo 4=0, the member of protection group 3 at partition P3 of drive D4 is selected because (X−Y+N−1) modulo W=(3−4+2−1) modulo 4=0, and so forth. The member of protection group 3 at partition P3 of drive D2, for example, is not selected because (3−2+2−1) modulo 0. The modulo arithmetic algorithm results in selection of M*(D+P) protection group members located in diagonally adjacent matrix locations characterized by incremented row and column numbers and adjacency with the previously selected locations. The diagonal wraps back to the first row and continues.

The selected protection group members are relocated within their columns in the manner described above such that selected protection group members are relocated from partition X of an existing drive to partition X of the new drive. In the illustrated example the selected protection group member at partition P1 of drive D2 is moved to partition P1 of drive D6, the selected protection group member at partition P2 of drive D3 is moved to partition P2 of drive D6, the selected protection group member at partition P3 of drive D4 is moved to partition P3 of drive D6, and so forth. The result of selection and relocation is a fully populated new row 6, and thus new drive D6, that does not contain more than one member of any protection group.

FIGS. 6B and 7A illustrate creation of new protection groups using the M*(D+P) partitions freed by selection and relocation of existing protection group members to the second new drive D6. FIG. 6B illustrates the free partitions created by selection and relocation of protection group members in accordance with the selection algorithm. As shown in FIG. 7A, M new protection groups are created in sets of (D+P) available partitions selected in order from P1 to Pmax. A first set of (D+P) available partitions consists of partition P1 of drive D2, partition P2 of drive D3, partition P3 of drive D4, and partition P4 of drive D1. A new protection group "C" is created in the first set of (D+P) available partitions. A second set of (D+P) available partitions consists of partition P5 of drive D3, partition P6 of drive D4, partition P7 of drive D1, and partition P8 of drive D2. A new protection group "D" is created in the second set of (D+P) available partitions.

FIG. 7B illustrates selection and relocation of protection group members to a third new drive D7 represented by column 7. The new drive is formatted with the same number of partitions as the existing drives of the drive subset and all partitions have the same size as the partitions of the existing drives. In order to utilize the additional storage capacity of the new drive D7 the drive manager selects and relocates certain protection group members in a manner that enables creation of one or more additional protection groups without locating more than one member of a protection group on the same drive. Selection is again determined by the modulo arithmetic where now N=3 because drive D7 is the third new drive added to the drive subset. In the illustrated example the member of protection group 3 at partition P3 of drive D1 is selected because (3−1+3−1) modulo 4=0, and so forth. The member of protection group 3 at partition P3 of drive D2 is not selected, for example, because (3−2+2−1) modulo 4≠0. The modulo arithmetic algorithm results in selection of M*(D+P) protection group members located in diagonally adjacent matrix locations characterized by incremented row and column numbers and adjacency with the previously selected locations. The diagonal wraps back to the first row and continues. The selected protection group members are relocated within their columns in the manner described above such that selected protection group members are relocated from partition X of an existing drive to partition X of the new drive. The result of selection and relocation is a fully populated new row 7, and thus new drive D7, that does not contain more than one member of any protection group.

FIGS. 8A and 8B illustrate creation of new protection groups using the partitions freed by relocation of existing protection group members to the third new drive D7. FIG. 8A illustrates the free partitions created by selection and relocation of protection group members in accordance with the selection algorithm. As shown in FIG. 8B, M new protection groups are created in sets of (D+P) available partitions selected in order from P1 to Pmax. A first set of (D+P) available partitions consists of partition P1 of drive D3, partition P2 of drive D4, partition P3 of drive D1, and partition P4 of drive D2. A new protection group "E" is created in the first set of (D+P) available partitions. A second set of (D+P) available partitions consists of partition P5 of drive D3, partition P6 of drive D4, partition P7 of drive D1, and partition P8 of drive D2. A new protection group "F" is created in the second set of (D+P) available partitions.

FIG. 9A illustrates selection and relocation of protection group members to a fourth new drive D8 represented by new column 8. The new drive is formatted with the same number of partitions as the existing drives of the drive subset and all partitions have the same size as the partitions of the existing drives. In order to utilize the additional storage capacity of the new drive D8 the drive manager selects and relocates certain protection group members in a manner that enables creation of one or more additional protection groups without locating more than one member of a protection group on the same drive. Selection is again determined by the modulo arithmetic where now N=4 because drive D8 is the fourth new drive added to the drive subset. In the illustrated example the member of protection group 1 at partition P1 of drive D4 is selected because (1−4+4−1) modulo 4=0, and so forth. The modulo arithmetic algorithm results in selection of M*(D+P) protection group members located in diagonally adjacent matrix locations characterized by incremented row and column numbers and adjacency with the previously selected locations. The diagonal wraps back to the first row and continues. The selected protection group members are relocated within their columns in the manner described above such that selected protection group members are relocated from partition X of an existing drive to partition X of the new drive. The result of selection and relocation is a fully populated new row 8, and thus new drive D8, that does not contain more than one member of any protection group.

Figure 10:
Figure 10:

FIGS. 9B and 10 illustrate creation of new protection groups using the partitions freed by movement of existing protection group members to the fourth new drive D8 and splitting of the subset of drives into two subsets of drives. FIG. 9B illustrates the free partitions created by selection and relocation of protection group members in accordance with the selection algorithm. As shown in FIG. 10, M new protection groups are created in sets of (D+P) available partitions selected in order from P1 to Pmax. A first set of (D+P) available partitions consists of partition P1 of drive D4, partition P2 of drive D1, partition P3 of drive D2, and partition P4 of drive D3. A new protection group "G" is created in the first set of (D+P) available partitions. A second set of (D+P) available partitions consists of partition P5 of drive D4, partition P6 of drive D1, partition P7 of drive D2, and partition P8 of drive D3. A new protection group "H" is created in the second set of (D+P) available partitions.

Because N=(D+P) when drive D8 is added a sufficient number of drives are available to support a split. A first new drive subset 350 is created from the N original drives D1-D4. A second new drive subset 352 is created from the N added drives D5-D8. Advantageously, the selection and relocation of protection group members as described above results in all members of any given protection group residing on either the original drives or the added drives but not both so further relocation is not required in preparation for the split. Further, protection group members of new drive subset 352 are located within single partitions of the added drives D5-D8 so the new drive subset is preconfigured for scaling with the modulo arithmetic algorithm following the split. The new drive subset 350 created from the original drives D1-D4 can be configured for scaling with the modulo arithmetic algorithm by relocating members of each protection group to the same partition.

Figure 11:
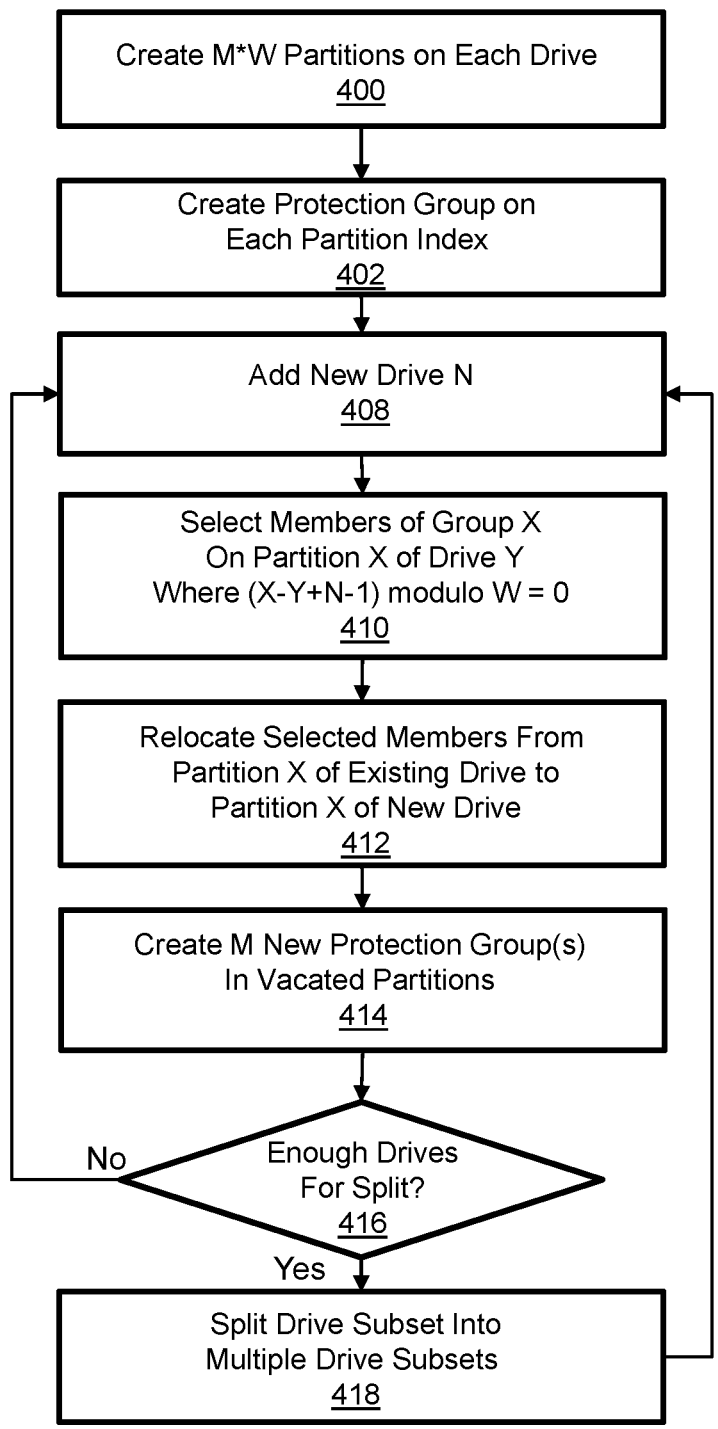
FIG. 11 illustrates a method for RAID member distribution for granular drive array growth.

FIG. 11 illustrates a method for RAID member distribution for granular drive array growth. Step 400 is creating M*W partitions on each drive of a drive subset that has (D+P) drives where W=(D+P) and M is an integer selected as a design choice. Step 402 is creating a RAID (D+P) protection group on each partition index. For example, a first protection group is created in partition P1 of each drive of the drive subset, a second protection group is created in partition P2 of each drive of the drive subset, and so forth. Step 408 is adding a new drive number N to the drive subset. New drives may be added for N=1 to (D+P). Step 410 is selecting members of protection group X at partition X of drive Y where (X−Y+N−1) modulo W=0. Alternatively, the modulo arithmetic of step 410 could be selecting the members of protection group X on partition X of drive Y that satisfy the condition (X+Y−N−1) modulo W=0. Step 412 is relocating the selected members to the same partition index of the new drive. In other words, selected protection group members are relocated from partition X of an existing drive to partition X of the new drive. Step 414 is creating M new protection groups in the partitions vacated in step 412. The M new protection groups are created in sets of (D+P) vacated partitions selected in order from P1 to Pmax. Step 416 is determining whether there are enough drives to create two drive subsets of (D+P) drives, i.e. whether there are enough drives for a split. Enough drives are available for a split when N=(D+P). If the number of drives is insufficient to support a split, then another new drive N is eventually added in step 408 as additional storage capacity is needed. Steps 408 through 416 can continue to loop until the number of drives is sufficient to support a split, following which step 418 is splitting the drive subset into two independent drive subsets. The drive subsets are independent in the sense that members of each protection group reside exclusively on only one of the drive subsets. One or both of the drive subsets resulting from the split may be scaled and eventually split as indicated by return of flow to step 408.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method, comprising:
creating a plurality of indexed partitions equal in size and number on (D+P) indexed drives;
creating protection groups that have D data members and P parity members on individual partition indexes of the (D+P) drives;
adding a new drive with indexed partitions equal in size and number to the indexed partitions of the (D+P) drives;
selecting protection group members located on the (D+P) drives using modulo arithmetic with protection group number, partition number, drive number, and new drive count as inputs; and
relocating the selected protection group members to the new drive.

2. The method of claim 1 wherein selecting protection group members using modulo arithmetic comprises selecting members of protection group X at partition X of drive Y that satisfy (X−Y+N−1) modulo W=0, where N is a count of new drives added to the (D+P) drives and W=(D+P).

3. The method of claim 1 wherein selecting protection group members using modulo arithmetic comprises selecting members of protection group X at partition X of drive Y that satisfy (X+Y−N−1) modulo W=0, where N is a count of new drives added to the (D+P) drives and W=(D+P).

4. The method of claim 2 wherein creating indexed partitions equal in size and number on the (D+P) indexed drives comprises creating M*W partitions where M is a positive integer.

5. The method of claim 4 wherein relocating the selected protection group members to the new drive comprises relocating the selected protection group members from partition X of one of the (D+P) drives to partition X of the new drive.

6. The method of claim 5 comprising creating M new RAID (D+P) protection groups in partitions made available by on the (D+P) drives by relocating the selected protection group members to the new drive.

7. The method of claim 6 comprising adding more new drives and splitting the (D+P) drives from the new drives when N=(D+P).

8. An apparatus, comprising:
a plurality of non-volatile drives;
a plurality of interconnected compute nodes that manage access to the drives; and
a drive manager configured to create a drive subset of (D+P) drives for implementation of protection groups that have D data members and P parity members, each of the selected drives having M*(D+P) sequentially indexed partitions; and
a drive manager responsive to addition of a new drive with indexed partitions equal in size and number to the indexed partitions of the (D+P) drives to select protection group members located on the (D+P) drives using modulo arithmetic with protection group number, partition number, drive number, and new drive count as inputs and relocate the selected protection group members to the new drive.

9. The apparatus of claim 8 wherein the drive manager selects members of protection group X at partition index X of drive Y that satisfy (X−Y+N−1) modulo W=0, where N is a count of new drives added to the (D+P) drives and W=(D+P).

10. The apparatus of claim 8 wherein the drive manager selects members of protection group X at partition index X of drive Y that satisfy (X+Y−N−1) modulo W=0, where N is a count of new drives added to the (D+P) drives and W=(D+P).

11. The apparatus of claim 9 wherein the drive manager creates M*W partitions where M is a positive integer.

12. The apparatus of claim 11 wherein the drive manager relocates the selected protection group members from partition X of one of the (D+P) drives to partition X of the new drive.

13. The apparatus of claim 12 wherein the drive manager creates M new RAID (D+P) protection groups in partitions made available by on the (D+P) drives by relocation of the selected protection group members to the new drive.

14. The apparatus of claim 13 wherein the drive manager splits the (D+P) drives from the new drives when N=(D+P).

15. A non-transitory computer-readable storage medium storing instructions that when executed by a computer cause the computer to perform a method for using a computer system to scale a subset of drives, the method comprising:
creating a plurality of indexed partitions equal in size and number on (D+P) indexed drives;
creating protection groups that have D data members and P parity members on individual partition indexes of the (D+P) drives;
adding a new drive with indexed partitions equal in size and number to the indexed partitions of the (D+P) drives;
selecting protection group members located on the (D+P) drives using modulo arithmetic with protection group number, partition number, drive number, and new drive count as inputs; and
relocating the selected protection group members to the new drive.

16. The computer-readable storage medium of claim 14 wherein the method further comprises selecting members of protection group X at partition X of drive Y that satisfy (X−Y+N−1) modulo W=0, where N is a count of new drives added to the (D+P) drives and W=(D+P).

17. The computer-readable storage medium of claim 14 wherein the method further comprises selecting members of protection group X at partition X of drive Y that satisfy (X+Y−N−1) modulo W=0, where N is a count of new drives added to the (D+P) drives and W=(D+P).

18. The computer-readable storage medium of claim 16 wherein the method further comprises creating M*W partitions where M is a positive integer.

19. The computer-readable storage medium of claim 18 wherein the method further comprises relocating the selected protection group members from partition X of one of the (D+P) drives to partition X of the new drive.

20. The computer-readable storage medium of claim 17 wherein the method further comprises creating M new RAID (D+P) protection groups in partitions made available by on the (D+P) drives by relocating the selected protection group members to the new drive.

21. The computer-readable storage medium of claim 17 wherein the method further comprises adding more new drives.

22. The computer-readable storage medium of claim 19 wherein the method further comprises splitting the (D+P) drives from the new drives when N=(D+P).

\* \* \* \* \*